Dec. 18, 1928.
S. R. BERGMAN
METHOD OF FORMING INDUCTION MOTORS
Original Filed Nov. 29, 1924
1,695,947
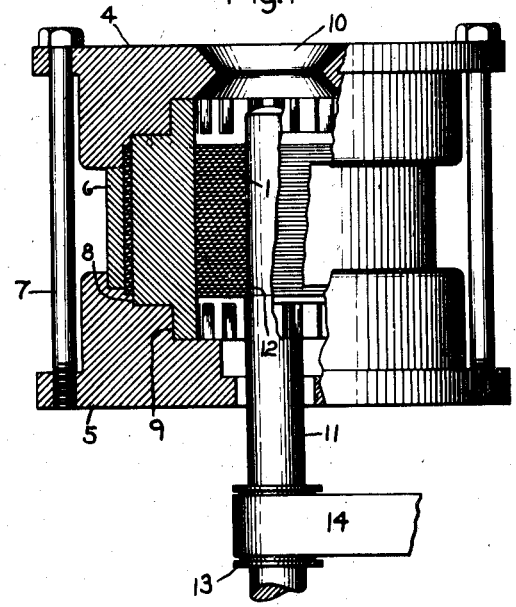
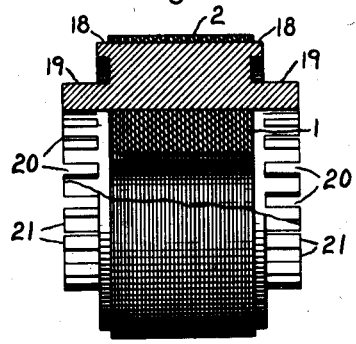
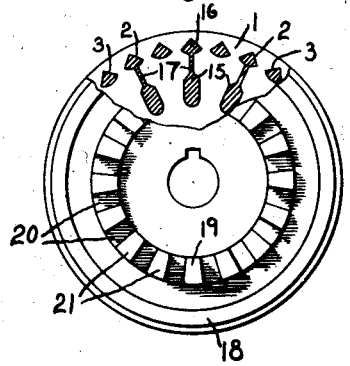
Inventor:
Sven R. Bergman,
by Charles E. Tullar
His Attorney.

Patented Dec. 18, 1928.

1,695,947

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

METHOD OF FORMING INDUCTION MOTORS.

Original application filed November 29, 1924, Serial No. 752,993. Divided and this application filed February 27, 1928. Serial No. 257,203.

My invention relates to induction motors and particularly to a method of forming the squirrel cages on the rotors of such motors.

The present application is a division of my application, Serial No. 752,993, filed Nov. 29, 1924.

It is well known that in order that an induction motor should start under load without an excessive current flow, it is necessary that the secondary circuit shall possess a high resistance, and on the other hand, that when the motor is up to speed the resistance and the reactance of the secondary circuit should be low in order to secure efficient operation.

It has been proposed heretofore to provide the secondary member of an induction motor with two squirrel cage windings, one of high resistance and low reactance and the other of low resistance and high reactance. When starting with such an arrangement, the frequency of the secondary currents is high and the high resistance winding will carry the greater part of the load, but when the motor is up to speed, the frequency of the secondary currents is low and the low resistance winding will carry the load.

My invention has for its object a novel method of forming the rotor of a motor of the above described type.

For a better understanding of my invention, reference may be had to the following description taken in connection with the accompanying drawing, in which Fig. 1 is a view partly in section of a mold and a rotor, the rotor representing its condition after the first step of my new method has been completed; Fig. 2 is a view partly in section of the completed rotor and Fig. 3 is an end view of the rotor of Fig. 2.

Referring to the drawing, 1 is the magnetic core of an induction motor having relatively deep conductor receiving openings 2 and shallow conductor receiving openings 3. In order to cast squirrel cage windings in these conductor receiving openings, the core 1 is placed in a suitable mold formed in such a manner that the slots will be entirely filled with conductor portions united at each end by a single end ring. I then, by a suitable tool, separate the single end ring into two component parts, one of small cross section and high resistance connecting the conductors in the shallow slots with the conductor portions in the tops of the deep slots and the other of large cross section and low resistance connecting together the conductor portions in the bottoms of the deep slots. In the casting operation I preferably employ a mold comprising end flange portions 4 and 5 and a cylindrical portion 6. The cylindrical portion 6 embraces the outer periphery of the core member and the flange portions 4 and 5 are fastened together as by bolts 7 so as to firmly clamp together the laminations forming the core 1. These flange portions engage the laminations at their outer periphery and each is cut away so as to have formed therein two cylindrical grooves 8 and 9. The groove 8 is narrow, whereas the groove 9 is wide, for a purpose which will be hereinafter explained. The flange 4 has an opening 10 therein through which molten metal may be poured to form conductors in the conductor receiving openings 2 and 3 and end rings in the grooves 8 and 9 integral with the conductors.

The squirrel cage windings may be cast by any suitable method. I have chosen to illustrate the centrifugal method of the Reist and Maxwell Patent No. 1,190,009, dated July 4, 1916. The mold and core are rotated as a unit in any suitable manner. For this purpose, there is shown a mandrel 11 fastened in the shaft receiving opening 12 of the core 1, the mandrel having mounted thereon a pulley 13, the whole being rotated by means of a belt 14. While the core and mold are being rotated, metal is poured through the opening 10. This metal flows down the large portions 15 of the deep conductor receiving openings 2 and also partially down the shallow conductor receiving openings 3 and partially down the small portion 16 of the deep conductor receiving openings 2. Such metal after flowing down through the portions 15 of the openings 2 also flows up the openings 3 and the portions 16 of the openings 2 uniting with the metal which flows down these openings. Molten metal also fills the cylindrical grooves 8 and 9 forming end rings of large cross section, one at each end of the rotor core. Metal also flows into the intermediate long, narrow portions 17 of the deep conductor receiving openings, which unites the conductors in the portions 15 and 16 of these openings into a single conductor. Sufficient metal is poured into the mold to form conductors in the slots 2 and 3 and end rings in the grooves 8 and 9. Rotation of the mold and core is continued until the molten metal has congealed. When the mold and parts are sufficiently cool to handle, the bolts 7 are removed, thereby permitting the parts 4, 5 and 6 of the mold to be removed. The conductors with their integral end rings firmly clamp the laminations together. After the rotor is removed from the mold, the end rings which were formed in the grooves 8 are machined in any suitable machine tool, so as to separate each of the large end rings into two separate, concentric end rings 18 and 19. The end rings 18 thus formed are of small cross-section and are integrally connected to the conductors formed in the shallow conductor receiving openings 3 and the conductors formed in the portions 16 of the deep conductor receiving openings 2 and form with these conductors a high resistance, low reactance squirrel cage winding. The end rings 19 are of large cross-section and are integrally connected with the conductors formed in the portions 16 of the deep conductor receiving openings 2 and form therewith a low resistance, high reactance squirrel cage winding.

I have shown the cylindrical grooves 9 of the flange portions of the mold provided with rectangular projections which act as cores to form longitudinally extending spaces 20 in the end rings 19. These spaces form fan blades 21 on these end rings. If desired, these projections may be omitted from the mold and the metal of the end rings machined away to form fan blades after the squirrel cages have been cast, or if desired, the fan blades may be omitted entirely.

In order to make a double squirrel cage motor, which can be thrown directly on a source of power and which will start under load with a small current consumption, it is necessary that the low reactance winding be of high resistance. I have found, however, that the smallest diameter of conductor receiving opening into which metal will flow and form a continuous conductor therethrough is about 2/10 of an inch. A squirrel cage winding formed of conductors of this size with end rings of large cross section united to both squirrel cages, is too low a resistance to effect successful starting under the above conditions. I conceived the idea of placing a considerable portion of the resistance of the low reactance squirrel cage winding in the end rings thereof, making it possible to use sufficiently large slots for the conductors of this winding, so that it could readily be cast. In order to get the resistance of this end ring sufficiently high for this purpose, I form it as explained above, that is, by casting it integral with the end ring for the low resistance winding and then separating it therefrom by a machining operation.

The deep conductor receiving openings 2, as explained above, have a large portion 15 at the bottom thereof and a small portion 16 at the top thereof, joined by an intermediate long, narrow portion 17. When the squirrel cage windings are cast, the conductors substantially completely fill these openings 2. The squirrel cage winding formed with the conductors in the small portion 16 of the slots is of high resistance for the reason pointed out above. It is of low reactance, because flux will not pass above it. On the other hand, the winding formed of the conductors in the larger portion 15 of the slots is of low resistance since not only are the conductors of large cross section, but so are the end rings joining them. This winding is of high reactance because of the narrow air gap provided above it by the long, narrow portion 17 of the slots, across which flux will pass when the motor is starting with little or no flux passing under this winding. I have found that the resistance of the low reactance winding should preferably be three times that of the higher reactance winding, so that when the motor is operating at normal speed and under load, this high resistance winding will carry the maximum current consistent with good efficiency, obtaining at the same time the best possible power factor.

The squirrel cage windings are preferably cast out of aluminum, but any other suitable metal may be used. If desired, the shallow conductor receiving openings 3 may be omitted, and the high resistance winding all placed in the portions 16 of the slots 2. I aim in the appended claims to cover all modifications of my invention which do not depart from the spirit and scope of my invention.

What I claim as new and desire to secure by Letters Patent of the United States, is:

1. The method of forming an induction motor squirrel cage on a magnetic core having deep conductor receiving openings therethrough, which consists in casting conductors in said conductor receiving openings and integral end rings of large cross-section, one at each end of said core, and thereafter separating each of the end rings into separate rings, one formed with the portions of the conductors in the top of the conductor receiving openings and the other formed with the portions of the conductors in the bottom of the conductor receiving openings.

2. The method of forming an induction motor squirrel cage on a magnetic core having relatively deep conductor receiving openings therethrough, which consists in casting conductors in said conductor receiving openings and integral end rings of large cross-section, one at each end of said core, and thereafter separating each of the end rings into concentric rings, one of relatively high resistance formed with the portions of the conductors in the top of the conductor receiving openings and the other of relatively low resistance formed with the portions of the conductors in the bottom of the conductor receiving openings.

In witness whereof, I have hereunto set my hand this twenty-fourth day of February, 1928.

SVEN R. BERGMAN.